Patented June 16, 1931

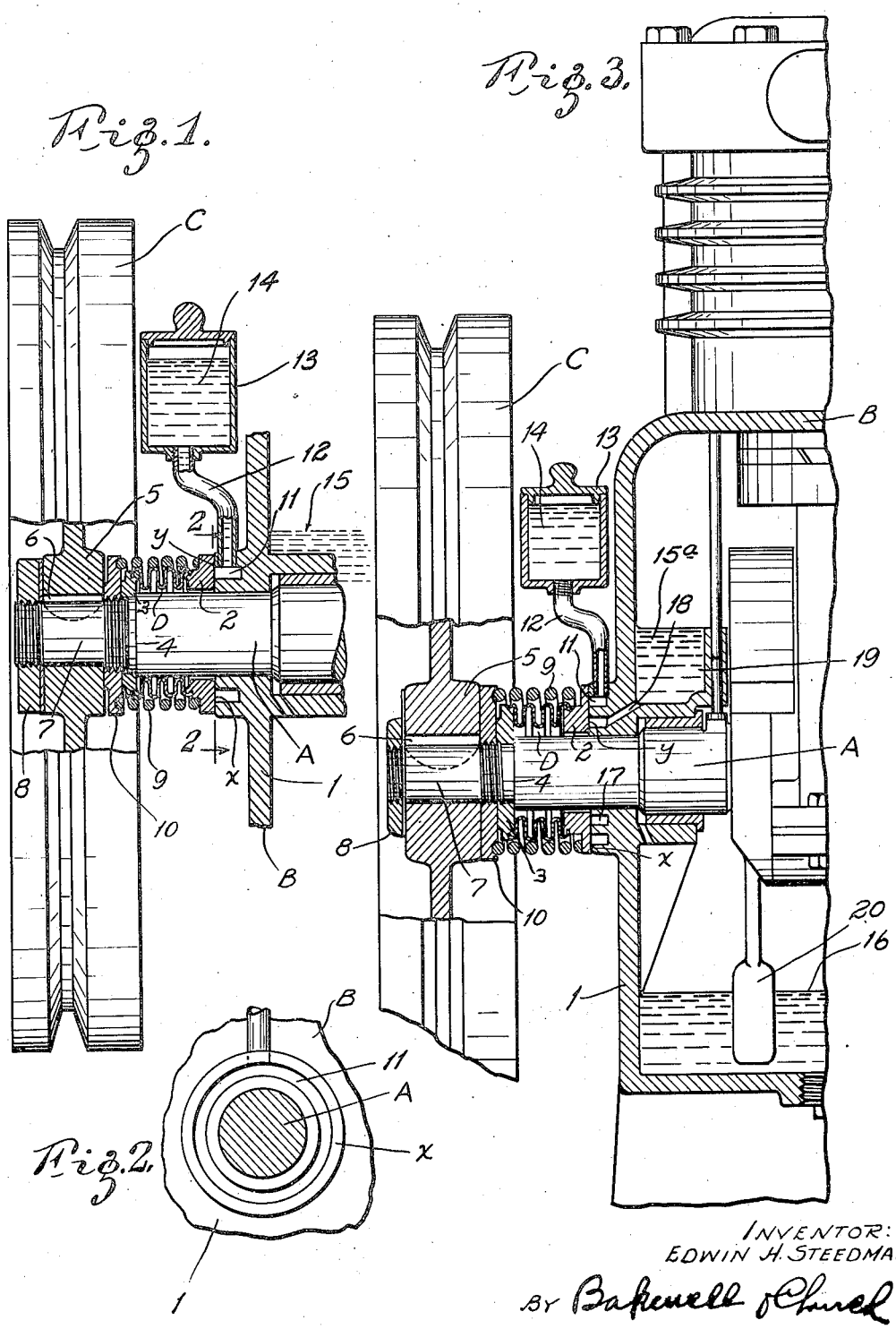

1,810,582

UNITED STATES PATENT OFFICE

EDWIN H. STEEDMAN, OF ST. LOUIS, MISSOURI

SHAFT SEALING DEVICE

Application filed April 27, 1927. Serial No. 186,964.

This invention relates to shaft sealing devices, such as are used for maintaining a gas-tight joint between a rotatable shaft and a wall or part through which said shaft projects, and particularly, to shaft sealing devices of the kind that are used in compressors and similar machines and which comprise a metallic bellows or other sleeve-like, expansible member combined with two opposed annular rubbing surfaces that surround the crank shaft, one of said rubbing surfaces being stationary and the other being rotatable.

One object of my invention is to provide a shaft sealing device of the general type mentioned, which is equipped with a novel means for preventing air from being sucked into the crank case of the machine through the joint between the stationary and rotatable rubbing surfaces of the device when a pressure below atmospheric pressure exists in the crank case. To this end I have devised a shaft sealing device in which one rubbing surface of the device is provided with a groove, recess, pocket or depression, which is adapted to hold and remain filled with a substance that will effectively seal the joint between said rubbing surfaces and prevent air from passing into the crank case through said joint when the internal pressure in the crank case is below atmospheric pressure.

Another object of my invention is to provide a crank shaft sealing device for compressors and similar machines, which is of such construction that a supply of oil will always be maintained in readiness to fill the joint between the stationary and rotatable rubbing surfaces of the device in the event the internal pressure of the crank case becomes so great that there is a tendency for the gases to escape through said joint, or in the event the internal pressure of the crank case drops below atmospheric pressure. To this end I have devised a shaft sealing device in which the co-operating rubbing surfaces are combined with two sources of supply of oil, one of which oil supplies is arranged so that an abnormal pressure in the crank case will cause oil to be forced outwardly through the joint between said rubbing surfaces, and the other supply of oil being arranged so that a minus pressure in the crank case causes oil to be drawn into the crank case through the joint between said rubbing surfaces. As gases cannot escape from the crank case when oil is being forced outwardly through the joint of the shaft sealing device, and as air cannot enter the crank case when oil is being forced inwardly through said joint, a shaft sealing device of the construction above described adds greatly to the commercial utility of a compressor that is used in connection with a refrigerating apparatus for compressing the refrigerant.

Figures 1 and 3 are vertical sectional views, illustrating two different forms of shaft sealing devices which embody my invention, i. e., a means for supplying a sealing substance to the co-operating rubbing surfaces of the device, so as to prevent air from leaking into the crank case when the pressure in the crank case is below atmospheric pressure and to prevent gases from leaking out of the crank case when the internal pressure of the crank case is abnormal; and Figure 2 is a transverse sectional view, taken on the line 2—2 of Figure 1, looking in the direction indicated by the arrows.

In the accompanying drawings which illustrate two different forms of my invention, A designates the crank shaft of a compressor or similar machine which projects laterally through the side wall of the crank case B, so as to co-operate with a driving means, such, for example, as a pulley C, that is mounted on the laterally-projecting portion of the crank shaft. The opening or joint between the crank shaft and the portion of the crank case through which said shaft projects is sealed by a shaft sealing device that comprises stationary and rotatable annular rubbing surfaces surrounding the crank shaft and disposed preferably at right angles to the axis of said shaft, and a bellows or other suitable sleeve-like member surrounding the crank shaft and attached to the crank shaft and to the rotatable rubbing surface so as to cause said rotatable surface to revolve with the crank shaft.

In the form of my invention herein shown the stationary annular rubbing surface $x$ of the device is carried by the crank case and is formed preferably by the portion of the outer face of the side wall 1 of the crank case which surrounds the hole in the crank case through which the crank shaft projects, said rubbing surface being arranged vertically and disposed at right angles to the longitudinal axis of the crank shaft. The rotatable rubbing surface $y$ of the device is formed by an annular member 2 that surrounds the crank shaft and which is arranged in opposed relation to the rubbing surface $x$. The bellows or other expansible and contractible sleeve-like member D of the device surrounds the crank shaft and is attached at one of its ends to the rotatable sealing member 2 and is attached at its opposite end to a part 3 that revolves with the crank shaft and which serves as a closure for one end of said bellows, the part 3 being herein illustrated as consisting of a ring that is clamped against a shoulder 4 on the crank shaft. Any suitable means can be used to detachably connect the hub 5 of the pulley C to the crank shaft, such as a longitudinally-disposed key 6 arranged in aligned slots in the hub of the pulley and in a reduced portion 7 of the crank shaft on which the pulley is mounted, and a nut 8 on the reduced portion of the crank shaft that exerts pressure on the hub of the pulley in a direction to clamp the ring 3 tightly against the shoulder 4 on the crank shaft. When the machine is in operation the bellows D and the sealing member 2 revolve with the crank shaft, and the rubbing surface $y$ on said sealing member presses tightly against the opposed stationary rubbing surface $x$ carried by the crank case, and thus forms a sealing device for the crank shaft that is efficient, inexpensive to construct and easy to install.

Preferably an expansion spring 9 is combined with the annular sealing member 2, so as to exert pressure on said member in a direction tending to force the rubbing surface $y$ on same tightly against the stationary rubbing surface $x$, as shown in Figure 2. In order that the pulley C may be removed from the crank shaft A without disturbing the bellows D or the opposed rubbing surfaces $x$ and $y$, the ring 3 to which the outer end of the bellows is attached is held pressed tightly against the shoulder 4 on the crank shaft by a nut 10 on the crank shaft that acts as an abutment for the inner side of the hub of the pulley C, said nut also being utilized to form a seat for the outer end of the spring 9.

As previously stated, my improved shaft sealing device is provided with a means for automatically maintaining a sealing substance in the joint between the opposed rubbing surfaces $x$ and $y$ of the device under certain conditions. So far as this feature of my invention is concerned it is immaterial whether the bellows D is stationary, or is arranged to revolve with the crank shaft, but in practice I prefer to combine the bellows with the crank shaft so that it will revolve with same, and attach one end of the bellows to the rotatable sealing member 2 of the device. In the form of my invention shown in Figure 1 the stationary rubbing surface $x$ is provided with an annular groove 11 that is adapted to hold a substance which will form an efficient seal between the rubbing surfaces $x$ and $y$ in the event the pressure in the crank case drops below atmospheric pressure. A reservoir 13 that holds an ample supply of a suitable sealing substance 14, consisting usually of oil, communicates with a duct or conduit 12 which leads to the groove 11, said duct 12 having no communication with the outside atmosphere and being so arranged that air cannot leak into same and thus find its way into the joint between the co-operating rubbing surfaces $x$ and $y$. If the internal pressure of the crank case drops to such a degree that there is a tendency for air to leak into the crank case through the joint between the opposed rubbing surfaces $x$ and $y$, the suction or minus pressure in the crank case causes oil to be drawn out of the groove 11 into the joint between the rubbing surfaces $x$ and $y$, thereby sealing said joint and preventing air from passing inwardly through same into the crank case. If the normal oil level of the crank case is above the crank shaft A, as indicated by the reference character 15 in Figure 1, an abnormal pressure in the crank case will cause oil in the crank case to be forced outwardly through the joint between the rubbing surfaces $x$ and $y$, and thus form a seal between said surfaces that prevents gas from escaping from the crank case. It will thus be seen that in a shaft sealing device of the construction illustrated in Figure 1 gas cannot pass into or out of said crank case through the joint in the rubbing surfaces $x$ and $y$, as the supply of oil 14 in the container 13 is always in readiness to flow into the joint between said rubbing surfaces whenever a minus pressure exists in the crank case and the supply of oil in the crank case is always in readiness to flow outwardly through the joint between said rubbing surfaces whenever the internal pressure of the crank case rises above normal.

In instances where my improved shaft sealing device is used on a compressor or similar machine in which the normal oil level of the crank case is below the crank shaft, as indicated by the reference character 16 in Figure 3, the stationary rubbing surface $x$ is provided with a second oil groove 17 that is connected by a duct 18 with a supply of oil $15^a$ contained in a reservoir 19 on the inside of the crank case, the oil being supplied to the reservoir 19 preferably by a throwing device 20 on the crank shaft that dips into the bath of oil 16 in the bottom of the crank case. The shaft sealing device illustrated in Figure 3 operates in practically the same manner as the shaft sealing device illustrated in Figure 1, i. e., an abnormal internal pressure in the crank case tending to cause gas to escape from the crank case will result in oil being forced outwardly from the groove 17 into the joint between the opposed rubbing surfaces $x$ and $y$ of the device, and a diminution in the pressure of the crank case sufficient to tend to cause air to be sucked into the crank case will cause oil to be drawn inwardly from the groove 11 into the joint between the rubbing surfaces $x$ and $y$ of the device.

While I prefer to provide the stationary rubbing surface of the device with one or more annular grooves for holding oil that is used to form a seal for the joint between the opposed stationary and rotatable rubbing surfaces, I wish it to be understood that my broad idea contemplates the use of any suitable sealing substance and that the shape or form of the portion of the rubbing surface in which the sealing substance is confined is immaterial and is not limited to an annular groove.

Having thus described my invention, what I claim as new and desire to secure by Letters Patent is:

1. In a compressor or similar machine, the combination of a crank shaft, a crank case having an opening in one of its walls through which said crank shaft passes, a stationary rubbing surface on the outer side of said wall surrounding said crank shaft opening and provided with two concentric, annular grooves arranged intermediate the inner and outer edges of said rubbing surface, a bellows surrounding said shaft and attached at one end by a gas-tight joint to a fixed part on said shaft, a sealing member connected by a gas-tight joint to the opposite end of said bellows and having a rubbing surface that co-acts with said stationary rubbing surface, said co-acting rubbing surfaces constituting the only joint through which air or gases can enter or escape from the interior of said bellows, and means for keeping both of the grooves in the stationary rubbing surface filled with a medium that will effectively seal the joint between said rubbing surfaces.

2. In a compressor or similar machine, the combination of a rotatable shaft, a casing having an opening in one of its walls through which said shaft passes, a stationary rubbing surface on the outer side of said wall surrounding said shaft opening, a rotatable sealing member arranged to revolve with the shaft and provided with a rubbing surface that co-acts with said stationary rubbing surface, a bellows surrounding the shaft and attached by gas-tight joints to same and to said rotatable sealing member, said co-acting rubbing surfaces constituting the only joint through which air or gas can enter or escape from the interior of said bellows, annular grooves in one of said rubbing surfaces arranged intermediate the inner and outer edges of same, and means for keeping said grooves filled with a substance that will effectively seal the joint between said rubbing surfaces.

EDWIN H. STEEDMAN.